(12) United States Patent
Ishii et al.

(10) Patent No.: US 8,475,332 B2
(45) Date of Patent: Jul. 2, 2013

(54) ROTARY MESHING ENGAGEMENT APPARATUS

(75) Inventors: Daisuke Ishii, Susono (JP); Shigeru Okuwaki, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/060,124

(22) PCT Filed: Apr. 24, 2009

(86) PCT No.: PCT/JP2009/058170
§ 371 (c)(1),
(2), (4) Date: Feb. 22, 2011

(87) PCT Pub. No.: WO2010/122664
PCT Pub. Date: Oct. 28, 2010

(65) Prior Publication Data
US 2012/0024652 A1    Feb. 2, 2012

(51) Int. Cl.
*H02P 15/00*    (2006.01)

(52) U.S. Cl.
USPC .......................................................... 477/8

(58) Field of Classification Search
USPC ............... 477/7–9, 13, 166, 170, 179; 475/5, 475/311, 330; 74/339, 340, 355
See application file for complete search history.

(56) References Cited

U.S. PATENT DOCUMENTS

| 2,798,142 | A | * | 7/1957 | Mancin | 219/217 |
| 2,875,876 | A | * | 3/1959 | Rudisch | 192/84.31 |
| 4,552,258 | A |   | 11/1985 | Sigg et al. | |
| 7,214,156 | B2 | * | 5/2007 | Oliver | 475/8 |
| 7,331,894 | B2 | * | 2/2008 | Sowul et al. | 475/138 |

FOREIGN PATENT DOCUMENTS

| JP | A-59-147120 | 8/1984 |
| JP | A-2006-38136 | 2/2006 |
| JP | A-2006-83919 | 3/2006 |
| JP | A-2009-1112 | 1/2009 |
| JP | A-2009-29394 | 2/2009 |
| JP | A-2009-68624 | 4/2009 |

OTHER PUBLICATIONS

International Search Report issued in International Application No. PCT/JP2009/058170 on Jun. 2, 2009 (with translation).

* cited by examiner

*Primary Examiner* — Justin Holmes
(74) *Attorney, Agent, or Firm* — Oliff & Berridge, PLC

(57) ABSTRACT

In a locking mechanism provided with: a sleeve which is fixed in the circumferential direction and which can be stroked in the shaft line direction; a hub which can rotate in the circumferential direction orthogonal to the shaft line direction; and an actuator which can apply a driving force for displacing the sleeve in the shaft line direction, dog teeth are formed on the inner circumferential surface of the sleeve, and dog teeth are formed in the hub. Here, the engagement surfaces of the dog teeth are inclined at a predetermined angle with respect to the shaft line such that the hub performs relative rotation with respect to the sleeve in a process in which the sleeve is stroked in the shaft line direction. The ECU estimates the stroke volume of the sleeve on the basis of the rotation amount of the hub and the predetermined angle.

3 Claims, 10 Drawing Sheets

Stroke direction (a)

(b)

(a)

(b)

US 8,475,332 B2

ROTARY MESHING ENGAGEMENT APPARATUS

TECHNICAL FIELD

The present invention relates to a rotary meshing engagement apparatus including an engaging device such as an electromagnetic dog clutch device.

BACKGROUND ART

As this type of rotary meshing engagement apparatus, there has been suggested a control apparatus for a vehicle which adopts a dog clutch (e.g. refer to a patent document 1). According to the control apparatus for the vehicle disclosed in the patent document 1, it is described that an engagement shock can be reduced by detecting a stroke volume with a stroke sensor at the time of engagement of the dog clutch and by adjusting a phase difference.

PRIOR ART DOCUMENT

Patent Document

Patent document Japanese Patent Application Laid Open No. 2006-083919

DISCLOSURE OF INVENTION

Subject to be Solved by the Invention

In the apparatus disclosed in the patent document 1, the stroke sensor is used to detect the stroke volume of engaging elements; however, in the configuration that this type of sensor is separately added, it causes an increase in cost and body size. On the other hand, if it is attempted to avoid the increase in cost and body size, then, inevitably, it is necessary to engage the engaging elements without detecting the stroke volume, and according to circumstances, drivability decreases due to the engagement shock or noises.

In view of the aforementioned problems, it is therefore an object of the present invention to provide a rotary meshing engagement apparatus capable of detecting the stroke volume of the engaging elements without causing the increase in cost and body size.

Means for Solving the Subject

The above object of the present invention can be achieved by a rotary meshing engagement apparatus provided with: an engaging device having a first engaging element, a second engaging element, and a driving force applying device, the first engaging element capable of rotating around a shaft line, the first engaging element provided with, on a surface, a first tooth-shaped member in which a plurality of convex portions and a plurality of concave portions are alternately arranged in a rotational direction, the second engaging element being opposed to the first engaging element and capable of engaging with the first engaging element in a direction of the shaft line, the second engaging element provided with, on a surface, a second tooth-shaped member having a plurality of convex portions and a plurality of concave portions which mesh with the convex portions and the concave portions of the first tooth-shaped member in a lock state in which the second engaging element engages with the first engaging element, the driving force applying device capable of applying a driving force to the first or second engaging element in order to displace the first or second engaging element along the shaft line from a position corresponding to a release state in which the first engaging element does not engage with the second engaging element to a position corresponding to the lock state, engagement surfaces of the first and second tooth-shaped members being inclined at a predetermined angle with respect to the shaft line such that the first engaging element and the second engaging element perform relative rotation in a process in which the first or second engaging element is displaced along the shaft line; a specifying device for specifying a relative rotation amount between the first engaging element and the second engaging element; and an estimating device for estimating a displacement amount in the shaft line direction of the first or second engaging element on the basis of the specified relative rotation amount and the predetermined angle in engaging the first engaging element and the second engaging element.

The rotary meshing engagement apparatus of the present invention is provided with the engaging device, the specifying device, and the estimating device, and it is applied to various power transmission apparatuses or the like which can include various transmission mechanisms, various locking mechanisms, various braking mechanisms, various torque transmission mechanisms and the like, in a vehicle or the like which can adopt various aspects. The rotary meshing engagement apparatus is an apparatus capable of selectively engaging one rotational element with another rotational element or non-rotatable fixed element.

The engaging device is provided with: the first engaging element; the second engaging element opposed to the first engaging element in the shaft line direction; and the driving force applying device, such as an electromagnetic actuator, which can drive one of the first and second engaging elements in the shaft line direction to the other. As a preferred form, the engaging element can adopt, for example, a form of electromagnetic dog clutch or the like. The engaging device can adopt, as its state, at least binary states which are the lock state in which the first engaging element engages with the second engaging element, and the release state in which the first and second engaging elements do not engage. The aspects of power transmission obtained in both cases are different from each other.

The first engaging element is provided, on its surface, with the first tooth-shaped member in which the plurality of convex portions and concave portions are alternately arranged in the rotational direction, and the second engaging element is provided, on its surface, with the second tooth-shaped member having the plurality of convex portions and the plurality of concave portions which mesh with the convex portions and the concave portions of the first tooth-shaped member in the lock state. At this time, each of the first and second tooth-shaped members may be formed on the facing surface of respective one of the first and second engaging elements or on a surface different from the facing surface. In the latter case, the first tooth-shaped member may be external teeth or internal teeth formed on the outer circumferential surface or inner circumferential surface of the first engaging element, and the second tooth-shaped member may be external teeth or internal teeth formed on the outer circumferential surface or inner circumferential surface of the second engaging element On the other hand, in engaging the first and second engaging elements with each other, it is desirable to gauge the displacement amount (i.e. stroke volume) of one of the engaging elements displaced in the shaft line direction due to the application of the driving force by the driving force applying device. If the displacement amount is not gauged, there is no practical way but to apply the driving force in accordance with a control amount determined in advance on the experimental, experiential, theoretical, or simulation basis. Thus, it is hard to make it certain to avoid the engagement shock and noise caused by the collision of the engaging elements or the tooth-shaped members or the like.

Moreover, if the driving force applied by the driving force applying device is reduced in the lock state to a holding driving force which is minimum necessary to maintain the lock state, then, the variation of torque applied in the rotational direction (torque for engaging the first tooth-shaped member and the second tooth-shaped member) likely chancel the lock state in unintended timing in some cases.

In such a case, the ungageable displacement amount results in at least a delay in the detection of the unintended cancellation of the lock state, thereby lengthening a period in which desirable power transmission is blocked. Separately adding a detecting device for detecting the displacement amount, such as a stroke sensor, in order to solve the above problem may cause an increase in cost and body size.

Thus, the engagement surfaces of the first and second tooth-shaped members of the present invention (i.e. surfaces in contact with or opposed to each other at the time of engagement) are inclined at the predetermined angle with respect to the shaft line such that the first engaging element and the second engaging element perform the relative rotation in the process in which the first or second engaging element is displaced along the shaft line.

In this configuration, the displacement amount in the shaft line direction is a geometric function with the relative rotation amount and the predetermined angle as parameters. The rotary meshing engagement apparatus of the present invention uses this point; namely, the specifying device specifies the relative rotation amount as the amount of the relative rotation caused by the shapes of the first and second tooth-shaped members, and the estimating device estimates the displacement amount on the basis of the specified relative rotation amount and the aforementioned predetermined angle.

Incidentally, "specify" in the present invention conceptually includes make a decision whether it is true or not as information which can be eventually referred to in terms of control, such as detect, calculate, estimate, identify, derive, select, and obtain, and the process for that purpose is, in effect, not limited to any aspects. As a preferred form, the specifying device and the estimating device of the present invention can adopt a form of various computer systems such as various controllers or microcomputer apparatuses, various processing units such as a single or a plurality of ECUs (Electronic Controlled Unit), which can appropriately include one or more CPUs (Central Processing Unit), MPUs (Micro Processing Unit), various processors or various controllers, or various memory devices such as a ROM (Read Only Memory), a RAM (Random Access Memory), a buffer memory or a flash memory, and the like.

Here, the "relative rotation amount" is equal to the rotation amount of the first engaging element if the second engaging element is the non-rotatable fixed element. Therefore, the specifying device of the present invention is different from a device which is separately added in order to directly detect the displacement amount and which causes the increase in cost and body size, such as a stroke sensor. The specifying device may be a detecting device which can be provided for other uses in the vehicle or the rotary meshing engagement apparatus in advance, or it may be a device for performing various processes (e.g. an arithmetic operation process, a process of electrically obtaining sensor output, and the like) by using the detection result of this type of detecting device. In any case, there is no increase in cost and body size in the estimation of the displacement amount associated with the estimating device.

Moreover, even if the second engaging element is the rotational element, the detecting device can be provided even on the second engaging element side for a reasonable reason (as long as it is the rotational element, it is inevitably provided with a mechanism which can directly or indirectly derive its rotational speed (which is the value of temporal differentiation of the rotation amount), so that the effect is not reduced at all.

As described above, according to the rotary meshing engagement apparatus of the present invention, by providing a geometric relation among the displacement amount in the shaft line direction, the rotation amount of the first and second rotational elements, and the predetermined angle associated with the first and second tooth-shaped members, as an arithmetic expression, an arithmetic algorithm or the like, experimentally, experientially, theoretically, or as a result of simulations or the like in advance, it is possible to accurately estimate the displacement amount on the basis of the rotation amount and the predetermined angle, for example, by performing an arithmetic operation process according to the arithmetic expression and the arithmetic algorithm or the like provided in advanced at each time, or by referring to a map or the like stored in a proper memory device in advance. In other words, it is possible to estimate the displacement amount in the shaft line direction of the first or second engaging element without causing the increase in cost and body size.

In addition, the rotary meshing engagement apparatus of the present invention has: a first technical idea that the displacement amount in the shaft line direction is estimated on the basis of the rotation amount in the rotational direction; and a second technical idea that a correlation is provided between the displacement amount and the rotation amount by the shapes of the first and second tooth-shaped members formed in the first and second engaging elements. The technical ideas provide the effect that the displacement amount can be estimated without the increase in cost and the increase in body size, which is extremely useful in practice and which is unique to the present invention.

In one aspect of the rotary meshing engagement apparatus of the present invention, the predetermined angle changes at a plurality of stages.

According to this aspect, the inclination angle to the shaft line direction defined on one engagement surface of each of the first and second tooth-shaped members changes at the plurality of stages. In this configuration, if the driving force for facilitating the displacement in the shaft line direction is constant or substantially constant, a rate of change in the relative rotation amount is changed at a position at which the inclination angle is changed, so that a reference position associated with the estimation of the displacement amount can be accurately determined. Therefore, it is possible to estimate the displacement amount, more highly accurately.

In another aspect of the rotary meshing engagement apparatus of the present invention, the rotary meshing engagement apparatus is further provided with a release force applying device for always applying a release force to the first or second engaging element in order to maintain the first or second engaging element at the position corresponding to the release state, and the driving force applying device applies the driving force which is greater than the release force, to the first or second engaging element, in engaging the first engaging element and the second engaging element.

According to this aspect, the release force for biasing the first or second engaging element toward the position corresponding to the release state is always applied by the release force applying device such as a return spring. Thus, in changing the lock state to the release state, the application of the driving force associated with the driving force applying device may be stopped, and thus it is possible to save energy resources to be supplied to the driving force applying device.

Incidentally, in this aspect, it may be further provided with: a judging device for judging whether or not the release force applying device is in a normal state on the basis of the estimated displacement amount; and a controlling device for controlling the driving force applying device to apply the driving force corresponding to the release force, to the first or second engaging element, if it is judged that the release force applying device is not in the normal state.

According to this aspect, for example, whether or not the release force applying device is in the normal state is judged by the judging device which can adopt a form of various computer systems such as various controllers or microcomputer apparatuses, various processing units such as a single or a plurality of ECUs (Electronic Controlled Unit), which can appropriately include one or more CPUs (Central Processing Unit), MPUs (Micro Processing Unit), various processors or various controllers, or various memory devices such as a ROM (Read Only Memory), a RAM (Random Access Memory), a buffer memory or a flash memory, and the like.

Such a judgment can be performed on the basis of the displacement amount in the shaft line direction of the first or second engaging element estimated by the estimating device. For example, in a case where there is the displacement in the shaft line direction beyond an allowable range although the lock state is to be maintained in terms of control, or in similar cases, it is possible to make a judgment that the release force applying device is in an abnormal state in which there is a physical, mechanical or electrical failure and damage or the like (i.e. not in the normal state).

If the release force applying device deviates from the normal state, it is hard to maintain or return the first or second engaging element at or to the position corresponding to the release state. According to circumstances, the first or second engaging element likely unintentionally moves into the lock state or continues the lock state.

According to this aspect, it is possible to substitute the driving force for the release force by using the controlling device which can adopt a form of various computer systems such as various controllers or microcomputer apparatuses, various processing units such as a single or a plurality of ECUs, which can appropriately include one or more CPUs, MPUs, various processors or various controllers, or various memory devices such as a ROM, a RAM, a buffer memory or a flash memory, and the like. Moreover, it is possible to make it certain to maintain the first and second engaging elements in the release state in proper timing, so that it is preferable.

In another aspect of the rotary meshing engagement apparatus of the present invention, the first engaging element is coupled with one rotational element out of a plurality of rotational elements in a hybrid vehicle, the hybrid vehicle provided with a rotating electrical machine; a drive shaft coupled with an axle; an internal combustion engine; and a power transmission mechanism provided with the plurality of rotational elements which allows mutual differential rotation and which includes a first rotational element coupled with the rotating electrical machine, a second rotational element coupled with the drive shaft, and a third rotational element coupled with the internal combustion engine, and the second engaging element is coupled with another rotational element or fixed element which is different from the one rotational element out of the plurality of rotational elements.

If the rotary meshing engagement apparatus of the present invention is used for the engagement between the one rotational element and the other rotational element or fixed element in this type of hybrid vehicle, it is possible to realize, for example, a so-called MG1 lock mode in which the hybrid vehicle is run only by the direct torque of the internal combustion engine by locking the rotating electrical machine to be non-rotatable, and a so-called O/D lock mode in which a transmission gear ratio is controlled such that the rotational speed of the internal combustion engine is less than the rotational speed of the drive shaft, and the like. Alternatively, in the configuration corresponding to a so-called two-motor hybrid in which the hybrid vehicle is provided with another rotating electrical machine coupled with the drive shaft, in a case of so-called multimode hybrid in which the roles of a reaction element for bearing the reaction torque of the internal combustion engine and an output element for assisting power to the drive shaft are changed as occasion demands, it is also preferably possible to apply the rotary meshing engagement apparatus of the present invention to the change between the reaction element and the output element, a change in a transmission shift stage, and the like.

The operation and other advantages of the present invention will become more apparent from the embodiments explained below.

BEST MODE FOR CARRYING OUT THE INVENTION

<Embodiments of the Invention>

Hereinafter, preferred various embodiments of the present invention will be explained with reference to the drawings.

<First Embodiment>

<Structure of Embodiment>

Figure 1:
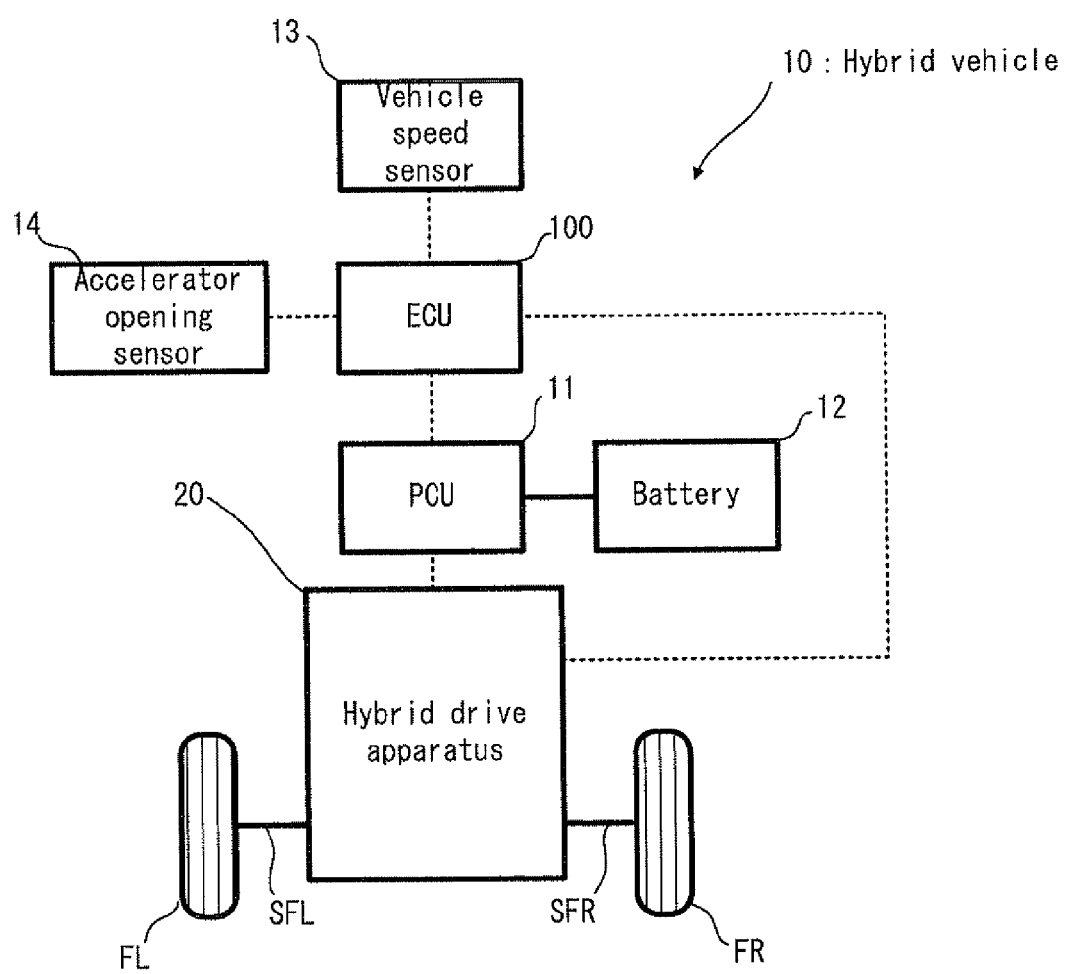
FIG. 1 is a schematic configuration diagram conceptually showing the structure of a hybrid vehicle in a first embodiment of the present invention.

Firstly, with reference to FIG. 1, an explanation will be given on the structure of a hybrid vehicle 10 in a first embodiment of the present invention. FIG. 1 is a schematic configuration diagram conceptually showing the structure of the hybrid vehicle 10.

In FIG. 1, the hybrid vehicle 10 is one example of the "hybrid vehicle" of the present invention, provided with: an ECU 100; a PCU (Power Control Unit) 11; a battery 12; a vehicle speed sensor 13; an accelerator opening sensor 14; and a hybrid drive apparatus 20.

The ECU 100 is provided with a CPU, a ROM, a RAM and the like. The ECU 100 is an electronic control unit which can control the operations of each part of the hybrid vehicle 10. The ECU 100 is one example of the "specifying device" and the "estimating device" of the present invention.

The PCU 11 includes a not-illustrated inverter which can convert direct-current (DC) power extracted from the battery 12 to alternating-current (AC) power and supply it to a motor generator MG1 and a motor generator MG2 described later and to convert AC power generated by the motor generator MG1 and the motor generator MG2 to DC power and supply it to the battery 12. The PCU 11 is a control unit which can control the input/output of the electric power between the battery 12 and each motor generator, or the input/output of the electric power between the motor generators (i.e. in this case, the electric power is given and received between the motor generators without via the battery 12). The PCU 11 is electrically connected to the ECU 100, and the operations of the PCU 11 are controlled by the ECU 100.

The battery 12 is a chargeable storage battery device which can function as an electric power source associated with the electric power for the power running of the motor generator MG1 and the motor generator MG2.

The vehicle speed sensor 13 is a sensor which can specify a vehicle speed V of the hybrid vehicle 10. The vehicle speed sensor 13 is electrically connected to the ECU 100, and the specified vehicle speed V is referred to by the ECU 100 with a constant or irregular period.

The accelerator opening sensor 14 is a sensor which can specify an accelerator opening degree Ta which is the operation amount of a not-illustrated accelerator pedal of the hybrid vehicle 10. The accelerator opening sensor 14 is electrically connected to the ECU 100, and the specified accelerator opening degree Ta is referred to by the ECU 100 with a constant or irregular period.

Figure 2:
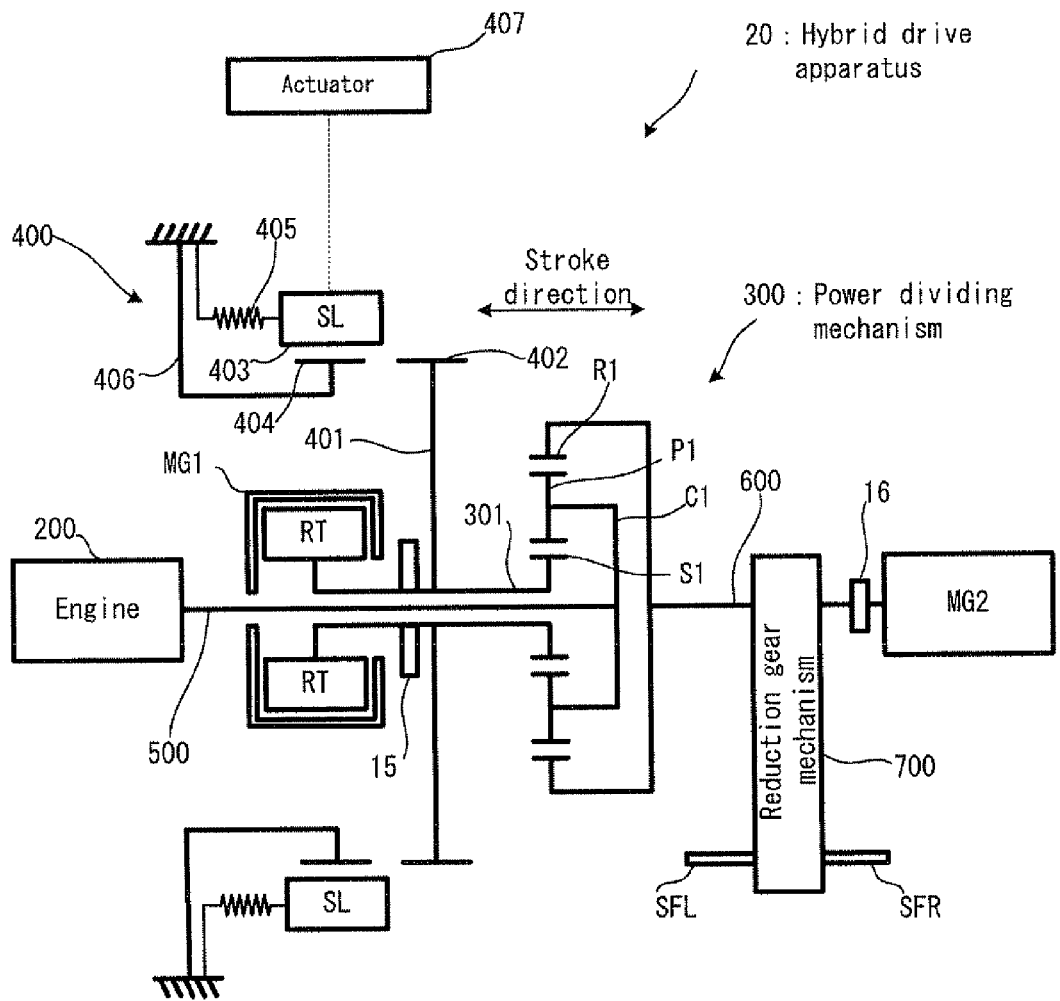
FIG. 2 is a schematic configuration diagram conceptually showing the structure of a hybrid drive apparatus in the hybrid vehicle in FIG. 1.

The hybrid drive apparatus 20 is a power unit which functions as the power train of the hybrid vehicle 10. With reference to FIG. 2, the detailed structure of the hybrid drive apparatus 20 will be explained. FIG. 2 is a schematic configuration diagram conceptually showing the structure of the hybrid drive apparatus 20. Incidentally, in FIG. 2, the overlap points with FIG. 1 will carry the same reference numerals, and the explanation thereof will be omitted as occasion demands.

In FIG. 2, the hybrid drive apparatus 20 is provided with an engine 200, a power dividing mechanism 300, a motor generator MG1 (hereinafter abbreviated to as a "MG1" as occasion demands), a motor generator MG2 (hereinafter abbreviated to as a "MG2" as occasion demands), a locking mechanism 400, an input shaft 500, a drive shaft 600, and a reduction gear mechanism 700.

The engine 200 is a gasoline engine as one example of the "internal combustion engine" of the present invention, which can function as the main power source of the hybrid vehicle 10. Incidentally, the "internal combustion engine" of the present invention means an engine which can convert the combustion of fuel to mechanical power, and the physical, mechanical or electrical configuration is not particularly limited, such as a fuel type (e.g. gasoline, light oil, alcohol, alcohol blended fuel, natural gas, and the like), the supply aspect of the fuel, the combustion aspect of the fuel, the structures of intake and exhaust systems, and cylinder arrangement. The engine 200 is provided with a crank shaft (not illustrated) as a power output shaft, and the crank shaft is coupled with an input shaft 40 of the hybrid drive apparatus 20.

The motor generator MG1 is a motor generator as one example of the "rotating electrical machine" of the present invention, and it is provided with a power running mechanism for converting electrical energy to kinetic energy and a regeneration function for converting kinetic energy to electrical energy. The motor generator MG2 is a motor generator, and as in the motor generator MG1, it is provided with the power running mechanism for converting electrical energy to kinetic energy and the regeneration function for converting kinetic energy to electrical energy. Incidentally, the motor generators MG1 and MG2 may be constructed as synchronous motor generators, and each of them may have the structure that it is provided with a rotor having a plurality of permanent magnets on an outer circumferential surface and a stator in which a three-phase coil for forming a rotating magnetic field is wound, or it may have a different structure.

The power dividing mechanism 300 is a planetary gear mechanism as one example of the "power transmission mechanism" of the present invention. The power dividing mechanism 300 is provided with: a sun gear S1 as one example of the "first rotational element" of the present invention, disposed in the central part; a ring gear R1 as one example of the "second rotational element" of the present invention, concentrically disposed on the outer circumference of the sun gear S1; a plurality of pinion gears P1, disposed between the sun gear S1 and the ring gear R1 and revolving around the sun gear S1 on the outer circumference of the sun gear S1 while rotating on its axis; and a planetary carrier C1 as one example of the "third rotational element" of the present invention, for pivotably supporting the rotating shaft of each pinion gear.

Here, the sun gear S1 is connected to the rotor (whose reference numerical is omitted) of the MG1 via a hollow sun gear shaft 301 (incidentally, the sun gear shaft 301 is one example of the "shaft line" of the present invention), and its rotational speed is equivalent to the rotational speed of the MG1 (hereinafter referred to as a "MG1 rotational speed Nmg1" as occasion demands). Moreover, the ring gear R1 is connected to the not-illustrated rotor of the MG2 via the drive shaft 600, which is the power output shaft of the hybrid drive apparatus 20, and the reduction gear mechanism 700, and its rotational speed is equivalent to the rotational speed of the MG2 (hereinafter referred to as a "MG2 rotational speed Nmg1" as occasion demands). Moreover, the planetary carrier C1 is connected to the input shaft 500, and its rotational speed is equivalent to the engine rotational speed NE of the engine 200.

On the other hand, the drive shaft 600 is coupled with drive shafts SFR and SFL (i.e. the drive shafts are one example of the "axle" of the present invention) for driving a right front wheel FR and a left front wheel FL, respectively, which are the drive wheels of the hybrid vehicle, via the reduction gear mechanism 700 including various reduction gears such as a differential. Therefore, motor torque Tm outputted from the motor generator MG2 to the drive shaft 600 is transmitted to each drive shaft via the reduction gear mechanism 700, and a driving force from each drive wheel transmitted via each drive shaft in the same manner is inputted to the motor generator MG2 via the reduction gear mechanism 700 and the drive shaft 600. In other words, the rotational speed of the motor generator MG2 has a unique relation with the vehicle speed V of the hybrid vehicle 10.

The power dividing mechanism 300 can divide the power generated by the engine 200 into the sung gear and the ring gear R1 at a predetermined ratio (a ratio corresponding to a gear ratio between the gears) by using the planetary carrier C1 and the pinion gear 305, and it can divide the power of the engine 200 into two systems.

Incidentally, the practical aspect of the "power transmission mechanism" of the present invention is not limited to the power dividing mechanism 300. For example, the power transmission mechanism of the present invention may be provided with a plurality of planetary gear mechanisms, and a plurality of rotational elements provided for one planetary gear mechanism may be appropriately coupled with each of a plurality of rotational elements provided for the other planetary gear mechanisms, thereby to constitute a unified or one-body differential mechanism. Moreover, the reduction gear mechanism 700 in the embodiment only reduces the rotational speed of the drive shaft 600 in accordance with a reduction ratio set in advance; however, the hybrid vehicle 10 may be provided with a multistage transmission provided with a plurality of transmission stages, whose components are a plurality of clutch mechanisms and a braking mechanism. Moreover, the multistage transmission may be formed as a compound planetary gear mechanism in which a plurality of planetary gear mechanisms are coupled as occasion demands, and the roles of an output element for inputting and outputting the power between the drive shaft 600 and a reaction element for bearing the reaction torque of the engine 200 may be selectively changed between the motor generator MG1 and the motor generator MG2.

The hybrid drive apparatus 20 is provided with: a first resolver 15 which is a rotation sensor capable of detecting the rotation amount of the motor generator MG1; and a second resolver 16 which is a rotation sensor capable of detecting the rotation amount of the motor generator MG2. Each of the resolvers is electrically connected to the ECU 100, and the detected rotation amount is referred to by the ECU 100 with a constant or irregular period. Incidentally, the ECU 100 can calculate the rotational speed of each motor generator (i.e. Nmg1 and Nmg2) by performing a temporal differentiation process on the detected rotation amount.

The locking mechanism 400 is provided with a hub 401, external teeth 402, a sleeve SL, internal teeth 403, external teeth 404, a return spring 405, a circular member 406, and an actuator 407. The locking mechanism 400 is a clutch mechanism which can selectively change the state of the motor generator MG1 (which is inevitably the state of the sun gear S1) between a release state which allows the rotation and a lock state which does not allow the rotation.

The hub 401 is a circular member as one example of the "first rotational element" of the present invention, which can rotate with the sun gear shaft 301 in a unified manner. On the outer circumferential surface of the hub 401, the external teeth 402 are formed as one example of the "first tooth-shaped member" of the present invention. Incidentally, the structure of the hub 401 will be described later.

The sleeve SL is a circular member as one example of the "second engaging element" of the present invention, which can be displaced in an illustrated stroke direction (i.e. shaft line direction). On the inner circumferential surface of the sleeve SL, the internal teeth 403 are formed as one example of the "second tooth-shaped member" of the present invention. Incidentally, the structure of the internal teeth 403 will be described later.

The locking mechanism 400 is provided with the circular member 406. The circular member 406 is provided, on the outer circumferential surface thereof, with the external teeth 404 which always mesh with the internal teeth 403 of the sleeve SL. On the other hand, the circular member 406 is fixed to a case (whose reference numerical is omitted) which is a fixed element, and it cannot rotate. Therefore, the sleeve SL, which is provided with the internal teeth 403 which mesh with the external teeth 404 formed on the outer circumferential surface of the circular member 406, is also a non-rotatable fixed element.

The actuator 407 is a known electromagnetic actuator as one example of the "driving force applying device" of the present invention, which can apply an electromagnetic force (i.e. one example of the "driving force" of the present invention) for displacing the sleeve SL in the stroke direction (i.e. shaft line direction), to the sleeve SL.

The actuator 407 is provided with a solenoid (electromagnet) as its driving force source, and it has such a mechanism that a drive current Id as an excitation current is supplied to the solenoid, thereby to generate an electromagnetic force for displacing the sleeve SL in the stroke direction. Incidentally, the actuator 407 is electrically connected to the PCU 11, and it can supply the drive current Id by power supply from the PCU 11. Therefore, the operation state of the actuator 407 is also controlled by the ECU 100. Incidentally, if the sign of the drive current Id is reversed, the displacement direction of the sleeve SL is reversed.

Here, if the driving force is supplied to the sleeve SL and the sleeve SL is displaced in the stroke direction to the right in FIG. 2, the internal teeth 403 formed on the inner circumferential surface of the sleeve SL mesh with the external teeth 402 formed on the outer circumferential surface of the hub 401. As described above, the sleeve SL cannot rotate as the internal teeth 403 always mesh with the external teeth 404, and in the state that the internal teeth 403 mesh with the external teeth 404, the hub 401 also cannot rotate. The hub 401 is coupled with the motor generator MG1, so that the motor generator MG1 is also in the non-rotatable lock state in this state.

On the other hand, the return spring 405 is coupled with the sleeve SL. The return spring 405 is an elastic member in which its one end is fixed to the case and the other end is coupled with the sleeve SL, and it always biases the sleeve SL in a direction of pulling the sleeve SL away from the hub 401. Therefore, if power distribution to the actuator 407 is stopped, the sleeve SL is displaced to a release position corresponding to the release state in which the internal teeth 403 do not mesh with the external teeth 402, by virtue of this biasing force (i.e. one example of the "release force" of the present invention. In other words, the return spring 405 is one example of the "release force applying device" of the present invention.

As described above, the locking mechanism 400 is provided with a so-called electromagnetic dog clutch mechanism including the hub 401, the sleeve SL and the actuator 407, as one example of the "engaging device" of the present invention.

Incidentally, the practical aspect of the "engaging device" of the present invention is not limited to the dog clutch mechanism but may have various aspects. Moreover, with or without the dog clutch mechanism, the aspect of the engagement between the engaging elements is not limited to this embodiment. For example, in the embodiment, each of the engaging elements is constructed as the circular member, and the tooth-shaped member formed on one outer circumferential surface engages with the tooth-shaped member formed on the other inner circumferential surface. However, the tooth-shaped member may be formed on the opposed surface of each of the engaging elements.

Figure 3:
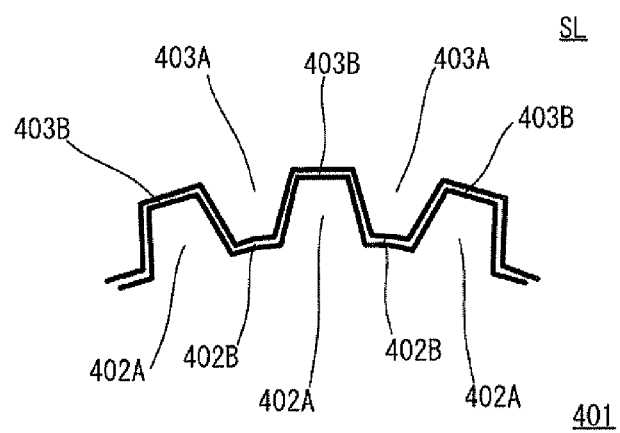
FIG. 3 is a plan view showing one portion of a sleeve and a hub, viewed in a stroke direction, in a lock state in a locking mechanism in FIG. 2.

Next, with reference to FIG. 3, a more detailed explanation will be given on the aspect of the engagement between the sleeve SL and the hub 401. FIG. 3 is a plan view showing one portion of the sleeve and the hub, viewed in the stroke direction, in the aforementioned lock state. Incidentally, in FIG. 3, the overlap points with FIG. 2 will carry the same reference numerals, and the explanation thereof will be omitted as occasion demands.

In FIG. 3, the internal teeth 403 of the sleeve SL have the structure that dog teeth 403A as one example of the "convex portions" of the present invention and depression portions 403B as one example of the "concave portions" of the present invention are arranged at predetermined intervals in a circumferential direction.

On the other hand, the external teeth 402 of the hub 401 have the structure that dog teeth 402A as another example of the "convex portion" of the present invention and depression portions 402B as another example of the "concave portion" of the present invention are arranged at predetermined intervals in the circumferential direction.

In this structure, in the process in which the sleeve SL is displaced in the stroke direction by the supply of the driving force from the actuator 407 described above, the dog teeth 403A of the sleeve SL are inserted to the depression portions 402B of the hub 401, and at the same time, the dog teeth 402A of the hub 401 are inserted to the depression portions 403B of the sleeve SL. The stroke volume Y of the sleeve SL (i.e. one example of the "displacement amount along the shaft line" of the present invention) reaches a maximum value Ymax, as shown in FIG. 3, the sleeve SL and the hub 401 completely mesh with each other, and the motor generator MG1 moves into the lock state.

Figure 4:
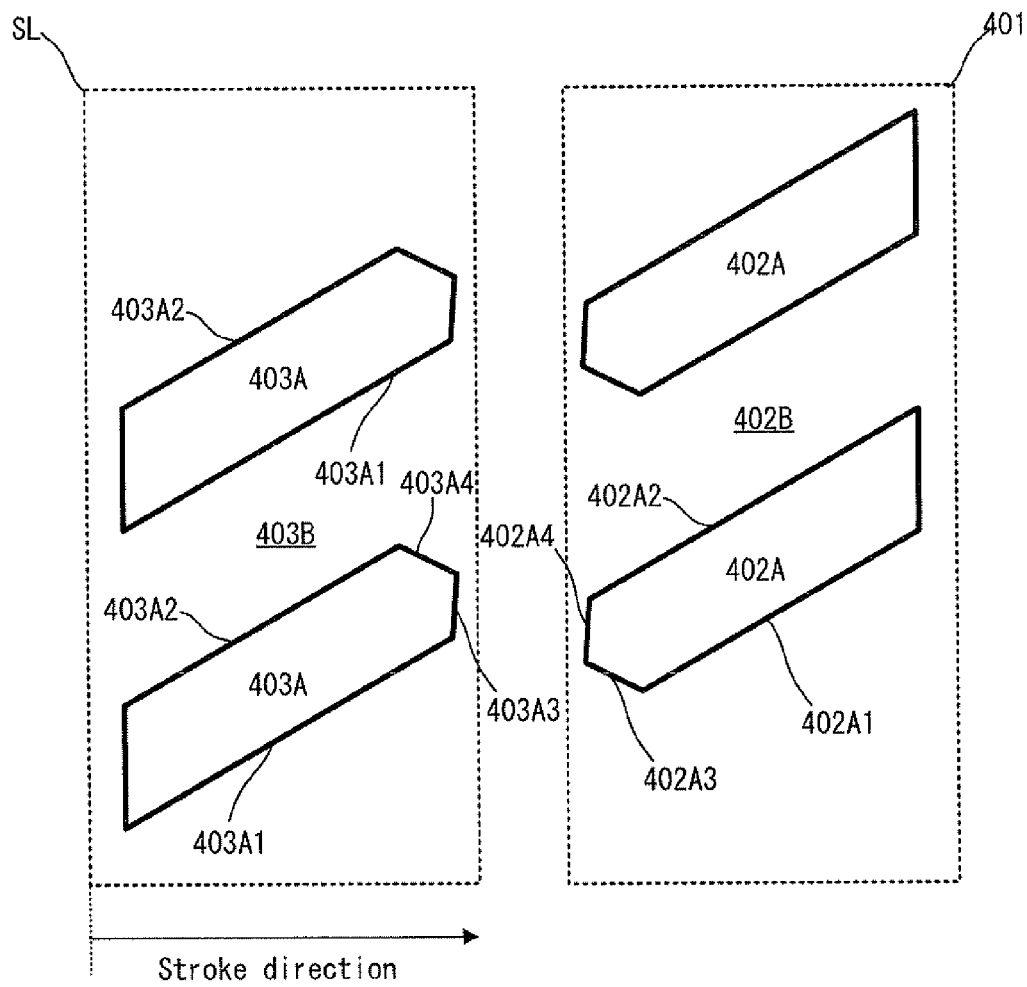
FIG. 4 is a top view showing one portion of the sleeve and the hub, viewed in a direction orthogonal to the stroke direction, in a release state in the locking mechanism in FIG. 2.

Next, with reference to FIG. 4, the detailed structure of the internal teeth 403 and the external teeth 402 will be explained. FIG. 4 is a top view showing one portion of the sleeve and the hub, viewed in a direction orthogonal to the stroke direction, in the aforementioned release state. Incidentally, in FIG. 3, the overlap points with FIG. 1 will carry the same reference numerals, and the explanation thereof will be omitted as occasion demands.

In FIG. 4, each of the dog teeth 403A is provided with engagement surfaces 403A1, 403A2, 403A3, and 403A4 in the circumferential direction. Incidentally, hereinafter, for convenience of explanation, the engagement surface 403A1 and the engagement surface 403A3 are referred to as "lower engagement surfaces", and the engagement surface 403A2 and the engagement surface 403A4 are referred to as "upper engagement surfaces", as occasion demands.

Moreover, in FIG. 4, each of the dog teeth 402A is provided with engagement surfaces 402A1, 402A2, 402A3, and 402A4 in the circumferential direction. Incidentally, hereinafter, for convenience of explanation, the engagement surface 402A1 and the engagement surface 402A3 are referred to as "lower engagement surfaces", and the engagement surface 402A2 and the engagement surface 402A4 are referred to as "upper engagement surfaces", as occasion demands.

As is seen from FIG. 4, each of the dog teeth has an inclined shape due to the rotation in the circumferential direction, with respect to a solid arrow for defining the stroke direction (i.e. a line along with the shaft line).

Figure 5:
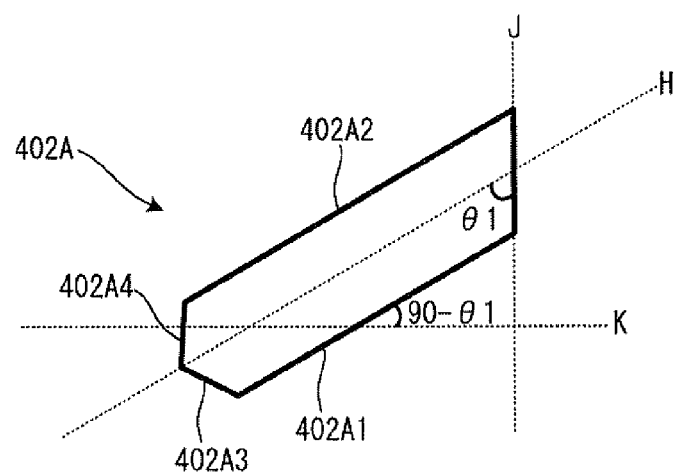
FIG. 5 is an enlarged view showing one dog tooth in FIG. 4.

Now, with reference to FIG. 5, the inclination of the dog teeth will be explained. FIG. 5 is an enlarged view showing one dog tooth in FIG. 4. Incidentally, in FIG. 5, the overlap points with FIG. 4 will carry the same reference numerals, and the explanation thereof will be omitted as occasion demands.

In FIG. 5, if a dashed line J for defining the circumferential direction is defined, a dashed line H for defining the extension direction of the engagement surface 402A1 and the engagement surface 402A2 is inclined at an angle of $\theta 1$ with respect to the dashed line J. Both the engagement surface 402A1 and the engagement surface 402A2 are inclined at an equal angle. Incidentally, the inclination of the engagement surfaces can be represented in the same manner even if a dashed line K for defining the stroke direction is defined, and the dashed line H for defining the extension direction of the engagement surface 402A1 and the engagement surface 402A2 is inclined at an angle of $(90-\theta 1)$ with respect to the dashed line K. Incidentally, the angle of $\theta 1$ is one example of the "predetermined angle" of the present invention.

On the other hand, in the dog tooth 402A, not only the engagement surface 402A1 and the engagement surface 402A2 but also the engagement surface 402A3 and the engagement surface 402A4 are also inclined at an angle different from the aforementioned $\theta 1$, with respect to the dashed line J. In other words, the shape of the dog tooth 402A is one example of the expression that "the predetermined angle changes at a plurality of stages" in the present invention. The explanation will be omitted on the inclination of the engagement surface 402A3 and the engagement surface 402A4 with respect to the shaft line.

Incidentally, the shape of the dog tooth 402A can easily represent the shape of the dog tooth 403A on the sleeve SL side if the engagement surfaces 402A1, 402A2, 402A3, and 402A4 are replaced with the engagement surfaces 403A1, 403A2, 403A3, and 403A4, respectively.

<Operations in Embodiment>

Figure 6:
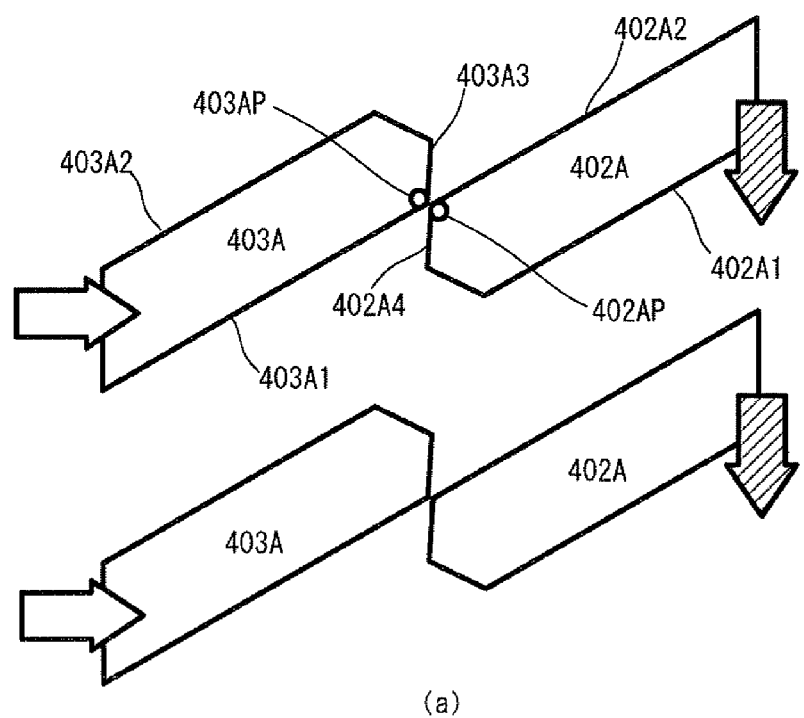
FIG. 6 are schematic top views exemplifying the state of the sleeve and the hub in a transition process from the release state to the lock state, in association with operations in the first embodiment.
Figure 6:
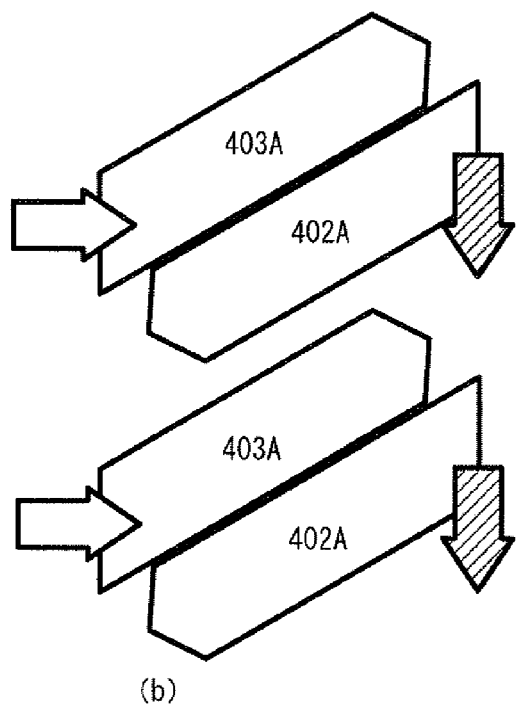

Next, with reference to FIG. 6, the operations of the locking mechanism 400 having such a structure will be explained. FIG. 6 are schematic top views exemplifying the state of the sleeve SL and the hub 401 in a transition process from the release state to the lock state. Incidentally, in FIG. 6, the overlap points with FIG. 4 will carry the same reference numerals, and the explanation thereof will be omitted as occasion demands.

In FIG. 6, FIG. 6(a) shows that the sleeve SL is displaced in the stroke direction, as shown by illustrated white arrows, due to the supply of the driving force (electromagnetic force) from the actuator 407 and that a boundary point 403AP between the engagement surface 403A1 and the engagement surface 403A3 is in contact with a boundary point 402AP between the engagement surface 402A2 and the engagement surface 402A4.

If the sleeve SL is further displaced from this state, the engagement surface 403A1 of each of the dog teeth 403A in the sleeve SL comes into contact with the engagement surface 402A2 of each of the dog teeth 402A in the hub 401. Here, the sleeve SL is the fixed element and the hub 401 is the rotational element, so that the hub 401 rotates in the circumferential direction by the sleeve SL, as shown by illustrated hatched arrows.

The rotation of the hub 401 continues until the displacement of the sleeve SL is stopped. FIG. 6(b) shows that the stroke volume Y of the sleeve SL reaches the maximum value Ymax through the engagement process and that the dog teeth 403A completely mesh with the dog teeth 402A.

Now, when the state of the motor generator MG1 is changed by the locking mechanism 400 between the lock state and the release state, the ECU 100 estimates the stroke volume Y of the sleeve SL, as part of the drive control of the actuator 407. At this time, the ECU 100 estimates the stroke volume Y of the sleeve SL in accordance with the following equation (1).

$$Y = X \cdot \tan\theta 1 \quad (1)$$

Here, the X is the rotation amount of the hub 401. As the rotation amount of the hub 401 is equivalent to the rotation amount of the MG1, the ECU 100 can gauge the rotation amount X, simply and accurately, by using the rotation amount of the MG1 detected by the first resolver 15. The above equation (1) is, as is seen with reference to FIG. 5, a relational expression determined due to a geometric relation between the sleeve SL and the hub 401.

As described above, according to the embodiment, the stroke volume Y of the sleeve SL is estimated as a result of a numerical operation process by using the rotation amount X of the hub 401 and the aforementioned angle of $\theta 1$. In other words, each of the dog teeth 402A and the dog teeth 403A has a shape in which it is "inclined at a predetermined angle with respect to the shaft line such that the first engaging element and the second engaging element perform relative rotation in a process in which the first or second engaging element is displaced along the shaft line" in the present invention. By using this relative rotation phenomenon (wherein the sleeve SL is the fixed element, so that the relative rotation amount matches the rotation amount of the hub 401), the stroke volume Y is accurately estimated on the basis of the rotation amount X.

Here, in particular, the first resolver 15 is a sensor which is inevitably provided due to the operational control of the motor generator MG1 and which is not provided separately for the estimation of the stroke volume Y. Therefore, for example, in comparison with the structure that a stroke sensor or the like is separately added in order to estimate this type of stroke volume, the increase in cost and body size is limited or controlled. Moreover, even if a vehicle is different from the hybrid vehicle 10 but is provided with the rotational element, then, the vehicle is generally constructed such that the rotation amount or rotational speed of the rotational element can be gauged directly or indirectly. Even if the engagement apparatus corresponding to the locking mechanism 400 is applied to a vehicle having any structure, there is no way to eliminate the effect of the embodiment which is extremely useful in practice.

On the other hand, this is not shown in FIG. 6, but as described above, each of the dog teeth 403A and the dog teeth 402A has the two types of engagement surfaces with different inclinations with respect to the line shaft, as the upper-side and lower-side engagement surfaces. In other words, in the dog teeth 403A, the engagement surface 403A2 and the engagement surface 403A4 correspond to the upper engagement surfaces, and the engagement surface 403A1 and the engagement surface 403A2 correspond to the lower engagement surfaces. Moreover, in the dog teeth 402A, the engagement surface 402A2 and the engagement surface 402A4 correspond to the upper engagement surfaces, and the engagement surface 402A1 and the engagement surface 402A2 correspond to the lower engagement surfaces.

As described above, in the case where there is a change in the inclination of the engagement surfaces on one side at multiple stages (which are two stages here but may be more stages), if the driving force supplied from the actuator 407 is constant or substantially constant (i.e. if the stroke volume per unit time is at least substantially constant), the rotation amount (i.e. rotational speed) of the hub 401 per unit time changes between a period in which the frontend-side engagement surfaces are in contact (i.e. a period in which the engagement surface 403A3 or the engagement surface 403A4 is in contact with the engagement surface 402A4 or the engagement surface 402A3) and a period in which the backend-side engagement surfaces are in contact (i.e. a period in which the engagement surface 403A1 or the engagement surface 403A2 is in contact with the engagement surface 402A2 or the engagement surface 402A1).

Therefore, in this structure, a time point at which the rotational speed of the hub 401 can be set as the reference timing of the stroke volume estimation. Considering that the maximum stroke volume after the reference timing is determined by the physical configuration of each of the dog teeth, if the reference timing can be gauged as described above, the engagement of the dog teeth can be performed in a desired aspect.

However, as far as the estimation of the stroke volume Y is concerned, even a single inclination to the shaft line in the upper and lower engagement surfaces will cause no problem. Incidentally, after the backend-side engagement surfaces start to come into contact, the control amount of the actuator 407 may be changed in any manner.

Moreover, FIG. 6 show the process in which the lower engagement surfaces of the dog teeth 403A engage with the upper engagement surfaces of the dog teeth 402A; however, of course, the upper engagement surfaces of the dog teeth 403A may engage with the lower engagement surfaces of the dog teeth 402A. In the case where the upper engagement surfaces of the dog teeth 403A may engage with the lower engagement surfaces of the dog teeth 402A, as for a temporal period (hereinafter referred to as a "blank period" as occasion demands) after the aforementioned boundary points are passed through, the rotation of the hub 401 is stopped because the engagement surface 403A2 and the engagement surface 402A1 gradually lose touch with each other in accordance with the stroke volume; however, if the stroke of the sleeve SL proceeds, then, the engagement surface 403A1 and the engagement surface 402A2 come into contact, and the rotation of the hub 401 is started. Thus, the stroke volume can be estimated in the same manner. Incidentally, even in this case, there is a flow of rotation, stop, rotation and so on, so the reference timing can be obtained as described above.

Incidentally, in the embodiment, the upper-side engagement surfaces and the lower-side engagement surfaces on the backend side are inclined in the same direction with respect to the shaft line. Thus, whether the lower engagement surfaces of the dog teeth 403A engage with the upper engagement surfaces of the dog teeth 402A or the upper engagement surfaces of the dog teeth 403A engage with the lower engagement surfaces of the dog teeth 402A, the hub 401 rotates in the same direction in the period in which the backend-side engagement surfaces are in contact. Moreover, between the transition process from the release state to the lock state and the transition process from the lock state to the release state, the rotational direction of the hub 401 is obviously reversed.

Thus, according to the structure in the embodiment, the estimation of the stroke volume is relatively easy.

Incidentally, whether the lower engagement surfaces of the dog teeth 403A engage with the upper engagement surfaces of the dog teeth 402A or the upper engagement surfaces of the dog teeth 403A engage with the lower engagement surfaces of the dog teeth 402A changes depending on the result of rotation synchronous control performed before the stroke control by the actuator 407. However, if phase synchronous control is also performed with the rotation synchronous control, it is possible to make a desirable position relation between the dog teeth 403A and the dog teeth 402A at a stroke start time point. In this case, in order to facilitate the obtainment of the reference timing described above, the relative phase between the sleeve SL and the hub 401 at the stroke start time point may be controlled such that the frontend-side engagement surfaces are firstly in contact.

<Second Embodiment>

<Structure of Embodiment>

Figure 7:
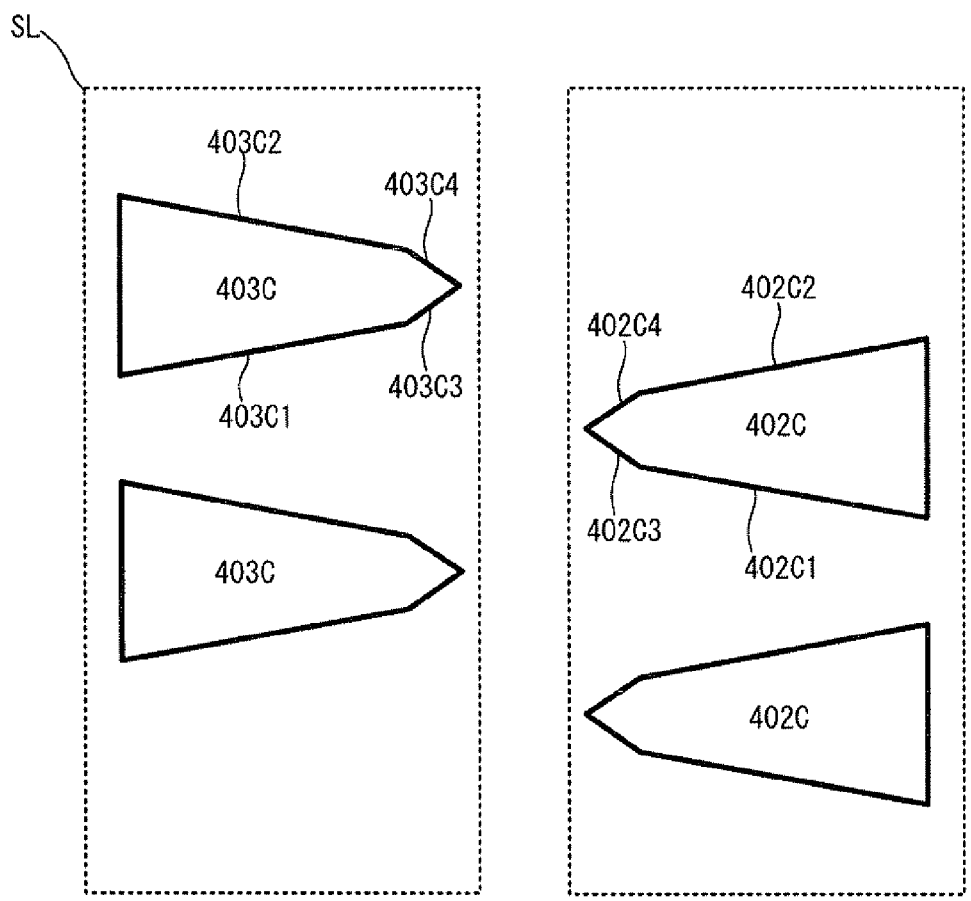
FIG. 7 is a top view showing one portion of the sleeve and the hub, viewed in the direction orthogonal to the stroke direction, in the release state, in association with the structure of a second embodiment.

The shape of the dog teeth is not limited to that in the first embodiment. Now, with reference to FIG. 7, an explanation will be given on the shape of the dog teeth in a second embodiment of the present invention. FIG. 7 is a top view showing one portion of the sleeve and the hub, viewed in the direction orthogonal to the stroke direction, in the release state. Incidentally, in FIG. 7, the overlap points with FIG. 4 will carry the same reference numerals, and the explanation thereof will be omitted as occasion demands.

As shown in FIG. 7, in the second embodiment, dog teeth 403C are formed in the sleeve SL, and dog teeth 402C are formed in the hub 401. Moreover, as in the first embodiment, each of the dog teeth 403C is provided with engagement surfaces 403C1, 403C2, 403C3 and 403C4, and each of the dog teeth 402C is provided with engagement surfaces 402C1, 402C2, 402C3 and 402C4.

Figure 8:
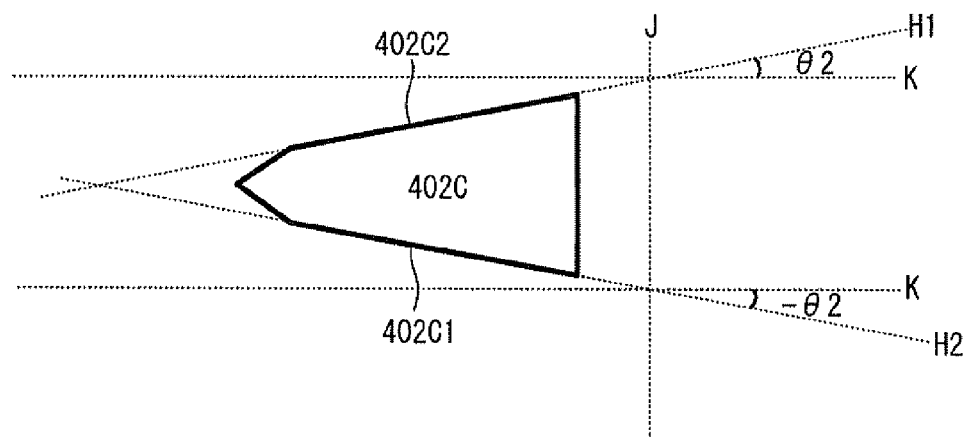
FIG. 8 is an enlarged view showing one dog tooth in FIG. 7.

Now, with reference to FIG. 8, the inclination of the dog teeth in the second embodiment will be explained. FIG. 8 is an enlarged view showing one dog tooth in FIG. 7. Incidentally, in FIG. 8, the overlap points with FIG. 7 will carry the same reference numerals, and the explanation thereof will be omitted as occasion demands.

In FIG. 8, if the clashed line K for defining the stroke direction is defined, a dashed line H1 for defining the extension direction of the engagement surface 402C2 is inclined at an angle of $\theta 2$ with respect to the dashed line K. On the other hand, a dashed line 112 for defining the extension direction of the engagement surface 402C1 is inclined at an angle of $\theta 2$ with respect to the dashed line K. Incidentally, the angle of $\theta 2$ is another example of the "predetermined angle" of the present invention.

Moreover, as in the first embodiment, not only the engagement surface 402C1 and the engagement surface 402C2 but also the engagement surface 402C3 and the engagement surface 402C4 are also inclined at an angle different from the aforementioned $\theta 2$, with respect to the dashed line K. In other words, the shape of the dog tooth 402C is one example of the expression that "the predetermined angle changes at a plurality of stages" in the present invention. The explanation will be omitted on the inclination of the engagement surface 402C3 and the engagement surface 402C4 with respect to the shaft line.

Incidentally, the shape of the dog tooth 402C can easily represent the shape of the dog tooth 403C on the sleeve SL side if the engagement surfaces 402C1, 402C2, 402C3, and 402C4 are replaced with the engagement surfaces 403C1, 403C2, 403C3, and 403C4, respectively.

<Operations in Embodiment>

Figure 9:
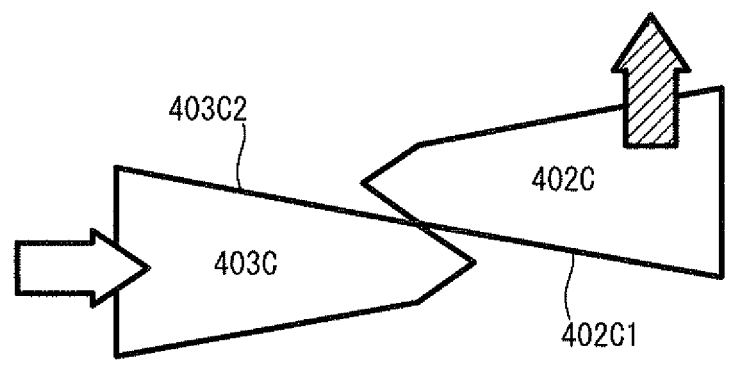
FIG. 9 are schematic top views exemplifying the state of the sleeve and the hub in the transition process from the release state to the lock state, in association with operations in the second embodiment.
Figure 9:
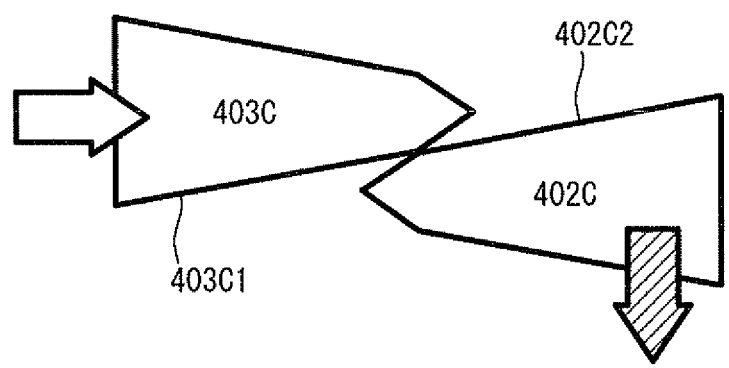

Next, with reference to FIG. 9, the operations of the locking mechanism 400 in the second embodiment will be explained. FIG. 9 are schematic top views exemplifying the state of the sleeve SL and the hub 401 in the transition process from the release state to the lock state. Incidentally, in FIG. 9, the overlap points with FIG. 7 will carry the same reference numerals, and the explanation thereof will be omitted as occasion demands.

In FIG. 9, FIG. 9(a) shows that the engagement surface 403C2, which is the upper-side engagement surface and the backend-side engagement surface of the dog tooth 403C, engages with the engagement surface 402C1, which is the lower-side engagement surface and the backend-side engagement surface of the dog tooth 402C. In this case, if the sleeve SL is stroked in an illustrated white arrow direction, the engagement surface 402C1 is pushed away (pushed up in the figure) by the engagement surface 403C2, and the hub 401 rotates in an upper direction in the figure as shown by an illustrated hatched arrow.

On the other hand, FIG. 9(b) shows that the engagement surface 403C1, which is the lower-side engagement surface and the backend-side engagement surface of the dog tooth 403C, engages with the engagement surface 402C2, which is the upper-side engagement surface and the backend-side engagement surface of the dog tooth 402C. In this case, if the sleeve SL is stroked in an illustrated white arrow direction, the engagement surface 402C2 is pushed away (pushed down in the figure) by the engagement surface 403C1, and the hub 401 rotates in a lower direction in the figure, as shown by an illustrated hatched arrow. Therefore, as in the first embodiment, the stroke volume Y of the sleeve SL can be accurately estimated on the basis of the rotation amount of the hub 401 and the aforementioned angle of $\theta 2$.

As described above, as in the second embodiment, in the case where the inclinations of the backend-side engagement surfaces of each of the dog teeth are symmetrical to the shaft line, the rotational direction of the hub 401 differs between when the upper-side engagement surfaces of the dog teeth 403C engage with the lower-side engagement surfaces of the dog teeth 402C and when the lower-side engagement surfaces of the dog teeth 403C engage with the upper-side engagement surfaces of the dog teeth 402C. Thus, in estimating the stroke volume Y of the sleeve SL in accordance with an estimating equation which can be easily changed from the aforementioned equation (1), there is a need to pay attention to the sign.

However, in practice, the sleeve SL is not likely displaced from a lock position to a release position at the time of transition from the release state to the lock state. Thus, regardless of the sign, there is no particular effect on the estimation of the stroke volume Y. Moreover, when it is necessary to secure further accuracy, it is also possible to estimate in which engagement pattern the dog teeth engage with each other in performing the rotation synchronous control and the phase synchronous control described above.

On the other hand, according to the embodiment, regardless of the engagement pattern in which the dog teeth engage with each other, the blank period explained in the first embodiment does not occur. Therefore, according to the embodiment, as long as the contact between the backend-side engagement surfaces is started after the contact between the frontend-side engagement surfaces, the maximum value Ymax of the stroke volume Y which can be detected (or estimated) is not influenced by the engagement pattern. In this regard, the second embodiment is slightly more advantageous than the first embodiment.

<Third Embodiment>

As exemplified in the first and second embodiments described above, according to the present invention, by inclining the dog teeth formed in the sleep SL and the hub 401 with respect to the shaft line, it is possible to estimate the stroke volume Y of the engaging element (or the sleeve SL in the embodiment) without causing the increase in cost and body size by separately adding the stroke sensor or the like. By using the effect which is extremely useful in practice and which is unique to the present invention, the ECU 100 can perform various controls. Hereinafter, as a third embodiment of the present invention, the details of various engagement controls which can be performed by the ECU 100 will be exemplified.

Figure 10:
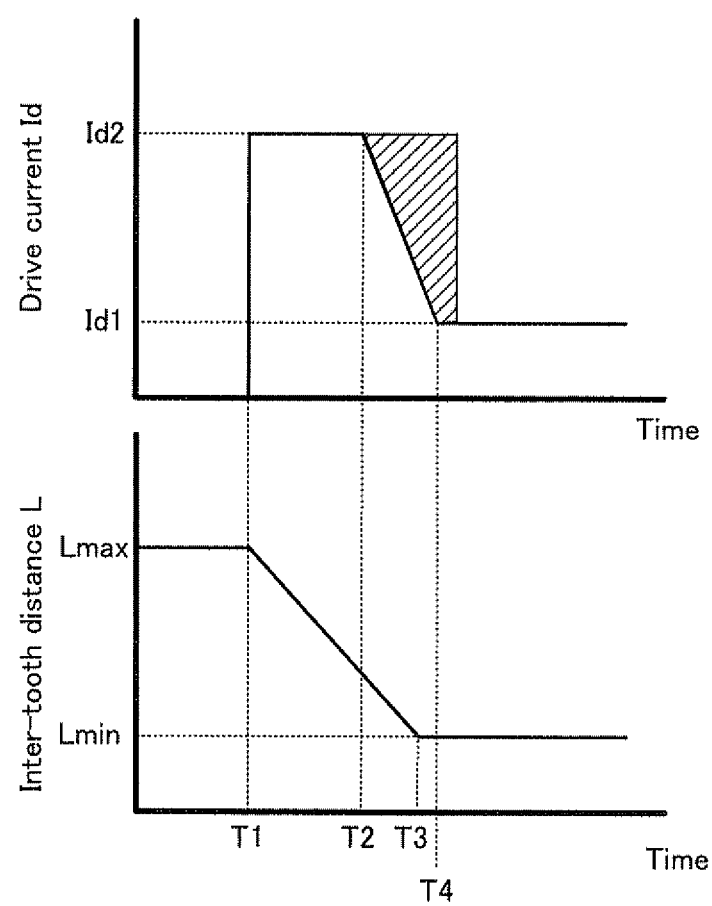
FIG. 10 is a schematic time characteristic diagram exemplifying one control aspect of an actuator in moving a MG1 from the release state to the lock state, in association with a third embodiment of the present invention.

Firstly, with reference to FIG. 10, an explanation will be given on a control example at the time of locking in which the MG1 is moved from the release state to the lock state. FIG. 10 is a schematic time characteristic diagram exemplifying one control aspect of the actuator 407 in moving the MG1 from the release state to the lock state.

In FIG. 10, the upper part exemplifies the time characteristic of the drive current Id of the actuator 407, and the lower part exemplifies the time characteristic of an inter-tooth distance L between the dog tooth 403A and the dog tooth 402A. Incidentally, the inter-tooth distance L means a distance in the stroke direction (shaft line direction) between an arbitrary portion of the dog tooth 403A and an arbitrary portion of the dog tooth 402A. The minimum value Lmin corresponds to the release position corresponding to the release state described above, and the maximum value Lmax corresponds to the lock position corresponding to the lock state.

In FIG. 10, if the stroke of the sleeve SL is started at a time point T1 and the drive current Id of the actuator 407 is controlled to Id2 adjusted in advance, the inter-tooth distance L starts to be gradually reduced from Lmax by the electromagnetic force of the actuator 407.

Here, the ECU 100 starts a process of gradually reducing the drive current Id. The gradual reduction process of the drive current Id continues until a time point T4, and the drive current Id is maintained to a holding current Id1 (Id1<Id2) at the time point T4. Moreover, at a time point T3 in the process, the inter-tooth distance L becomes the minimum value Lmin, and the locking of the MG1 is completed.

Incidentally, the holding current is a drive current required to maintain the lock state. In the lock state, the dog teeth 403A engage with the dog teeth 402A in a state in which there is no space in the rotational direction of one of the dog teeth 403A and 402A. Thus, the lock state can be easily maintained with a smaller electromagnetic force than that at the time of stroke.

Here, in particular, for comparison, if this type of lock control is performed without the stroke volume gauged, the ECU 100 cannot determine the timing to start the gradual decrease of the drive current Id because the stroke volume Y of the sleeve SL cannot be gauged. As a result, the power distribution is also stopped behind the time point T4, and a power distribution loss corresponding to an illustrated hatched area can occur. In other words, by virtue of the control in the embodiment, it is possible to save the drive electric power of the actuator 407.

Figure 11:
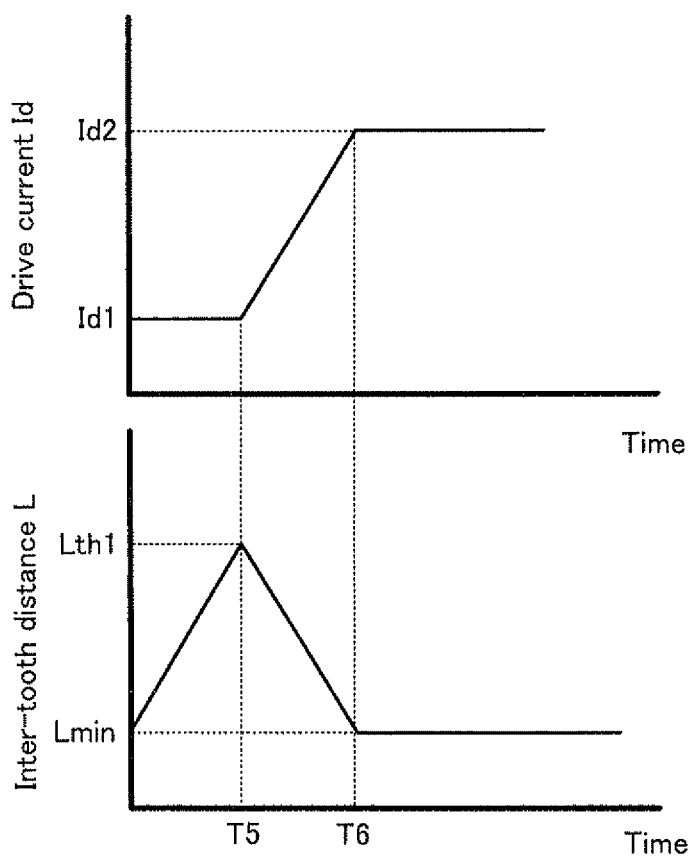
FIG. 11 is a schematic time characteristic diagram exemplifying one control aspect of the actuator in the MG1 lock state, in association with the third embodiment.

Next, with reference to FIG. 11, an explanation will be given on a control example in the case where the MG1 is in the lock state. FIG. 11 is a schematic time characteristic diagram exemplifying one control aspect of the actuator 407 in the MG1 lock state. Incidentally, in FIG. 11, the overlap points with FIG. 10 will carry the same reference numerals, and the explanation thereof will be omitted as occasion demands.

In FIG. 11, for example, it is assumed that a change in driving force in the hybrid vehicle 10 or the like temporarily breaks the engagement between the sleeve SL and the hub 401, that an engagement force decreases, and that the biasing force of the return spring 405 increases the inter-tooth distance L from the minimum value Lmin (i.e. corresponding to the displacement of the sleeve LS toward the release position).

Here, if the stroke volume Y of the sleeve SL can be detected, the ECU 100 can increase the drive current Id at a time point T5 at which the inter-tooth distance L increases to Lth1. As a result, at a time point T6, the inter-tooth distance L returns to Lmin corresponding to the lock position. As described above, according to the embodiment, it is possible to quickly avoid that the disengagement of the dog teeth which can happen suddenly or accidentally, thereby preferably maintaining the lock state of the MG1.

Figure 12:
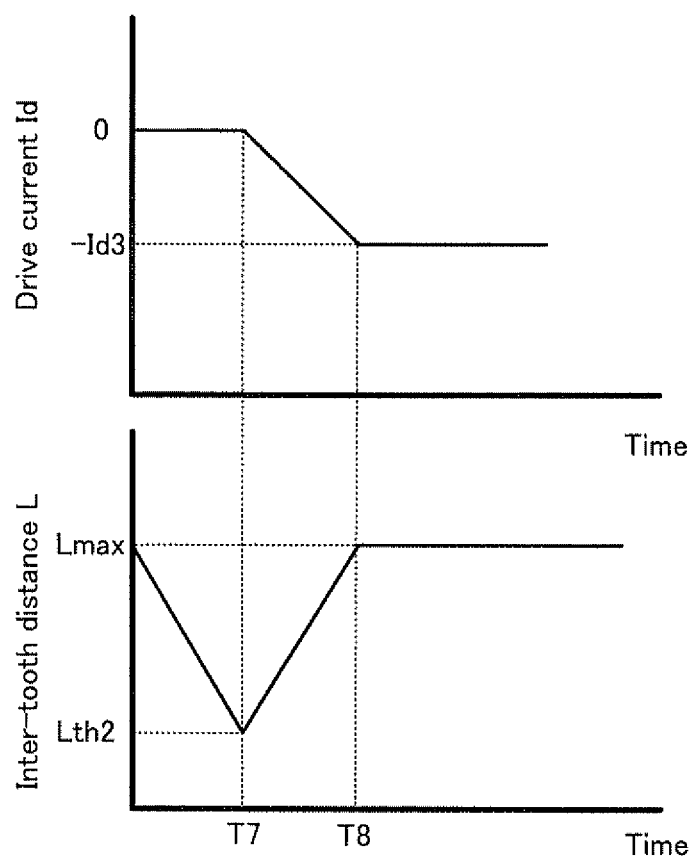
FIG. 12 is a schematic time characteristic diagram exemplifying one control aspect of the actuator in a period in which the MG1 is in the release state, in association with the third embodiment.

Next, with reference to FIG. 12, an explanation will be given on a control example in the case where the MG1 is in the release state. FIG. 12 is a schematic time characteristic diagram exemplifying one control aspect of the actuator 407 in a period in which the MG1 is in the release state. Incidentally, in FIG. 12, the overlap points with FIG. 10 will carry the same reference numerals, and the explanation thereof will be omitted as occasion demands.

In FIG. 12, in a case where the drive current Id of the actuator 407 is zero, i.e. in a case where the MG1 is maintained in the release state originally due to the biasing force of the return spring 405, if the biasing force expected in advance cannot be obtained due to the damage of the return spring 405 or the like, the sleeve SL is stroked in the direction of the hub 401 without a driver's intention in some cases. In FIG. 12, it is assumed that as a result of the unintended stroke of the sleeve SL, the inter-tooth distance L decreases to Lth2 which is less than its proper distance Lmax at a time point T7.

Here, the ECU 100 detects that by the estimated stroke volume Y of the sleeve SL and supplies a negative drive current, −Id3, to the actuator 407 at the time point T7. The actuator 407 can reverse the direction of the electromagnetic force applied to the sleeve SL by using the positive and negative drive current. Thus, by providing the negative drive current, the sleeve SL starts the stroke toward the release position and returns to its proper release position at a time point T8. In other words, according to the control, it is possible to judge whether or not the return spring 405 is in an abnormal state (at least, in a state in which the release force expected in advance cannot be applied) by the estimation of the stroke volume Y, thereby accurately substituting the actuator 407 for the function of the return spring 405 and preferably maintaining the sleeve SL at the release position.

Incidentally, in this control aspect, the ECU 100 functions as one example of each of the "judging device" and the "controlling device" of the present invention.

Figure 13:
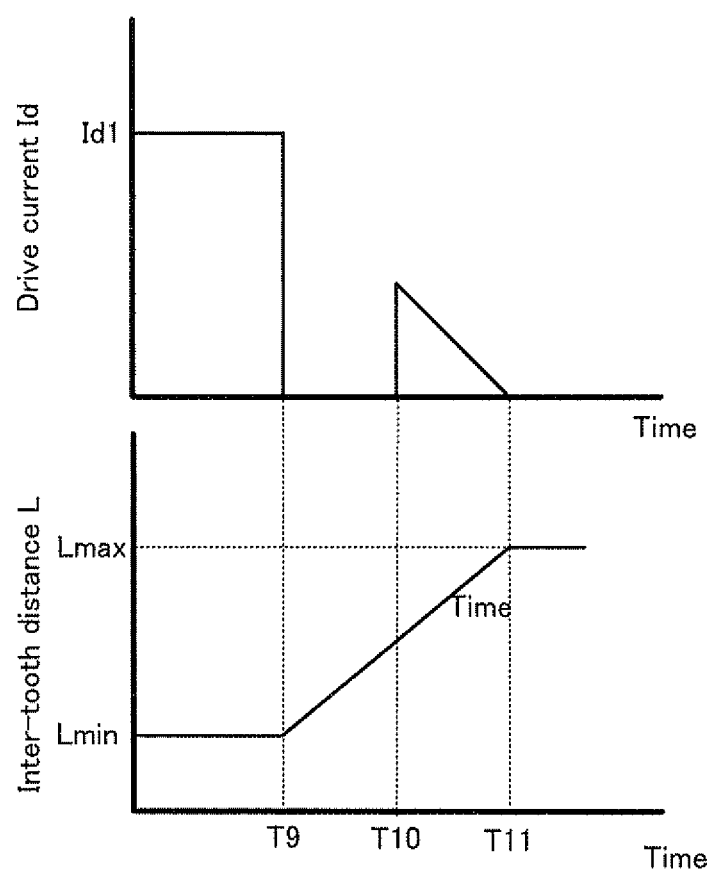
FIG. 13 is a schematic time characteristic diagram exemplifying one control aspect of the actuator in moving the MG1 from the lock state to the release state, in association with the third embodiment of the present invention.

Next, with reference to FIG. 13, an explanation will be given on a control example in the case where the state of the MG1 is moved from the lock state to the release state. FIG. 13 is a schematic time characteristic diagram exemplifying one control aspect of the actuator 407 in moving the MG1 from the lock state to the release state. Incidentally, in FIG. 13, the overlap points with FIG. 10 will carry the same reference numerals, and the explanation thereof will be omitted as occasion demands.

In FIG. 13, it is assumed that the drive current Id of the actuator 407 is changed from the holding current Id1 to zero at a time point T9 and that the transition into the release state by the return spring 405 is started. However, if nothing is done, the biasing force of the return spring 405 likely accelerates the sleeve SL and causes at least a release shock.

Thus, the ECU 100 performs small-scale power distribution on the actuator 407 at a time point T10 at which the return to the release position of the sleeve SL proceeds to some degree, by the estimation of the stroke volume Y. As a result of the small-scale power distribution from the time point T10 to a time point T11 so as to gradually reducing the drive current Id, an electromagnetic force acting in the opposite direction to the biasing force of the return spring 405 cancels the excessive biasing force of the return spring 405, and the inter-tooth distance L smoothly returns to the minimum value Lmax at the time point T11 without causing the release shock.

The present invention is not limited to the aforementioned embodiments, but various changes may be made, if desired, without departing from the essence or spirit of the invention which can be read from the claims and the entire specification. A rotary meshing engagement apparatus, which involves such changes, is also intended to be within the technical scope of the present invention.

INDUSTRIAL APPLICABILITY

The present invention can be applied to a rotary meshing engagement apparatus for meshing tooth-shaped members for engagement with each other, which are formed in each of a plurality of engaging elements.

DESCRIPTION OF REFERENCE CODES

10 hybrid vehicle
15 first resolver
100 ECU
200 engine
300 power dividing mechanism
MG1 motor generator
MG2 motor generator
400 locking mechanism
500 input shaft
600 drive shaft
700 reduction gear mechanism

The invention claimed is:

1. A rotary meshing engagement apparatus comprising:
an engaging device having a first engaging element, a second engaging element, and a driving force applying device, the first engaging element capable of rotating around a shaft line, the first engaging element comprising, on a surface, a first tooth-shaped member in which a plurality of convex portions and a plurality of concave portions are alternately arranged in a rotational direction, the second engaging element being opposed to the first engaging element and capable of engaging with the first engaging element in a direction of the shaft line, the second engaging element comprising, on a surface, a second tooth-shaped member having a plurality of convex portions and a plurality of concave portions which mesh with the convex portions and the concave portions of the first tooth-shaped member in a lock state in which the second engaging element engages with the first engaging element, the driving force applying device capable of applying a driving force to the first or second engaging element in order to displace the first or second engaging element along the shaft line from a position corresponding to a release state in which the first engaging element does not engage with the second engaging element to a position corresponding to the lock state, engagement surfaces of the first and second tooth-shaped members being inclined at a predetermined angle with respect to the shaft line such that the first engaging element and the second engaging element perform relative rotation in a process in which the first or second engaging element is displaced along the shaft line;
a specifying device for specifying a relative rotation amount between the first engaging element and the second engaging element;
an estimating device for estimating a displacement amount in the shaft line direction of the first or second engaging element on the basis of the specified relative rotation amount and the predetermined angle in engaging the first engaging element and the second engaging element;
a release force applying device for always applying a release force to the first or second engaging element in order to maintain the first or second engaging element at the position corresponding to the release state;
a judging device for judging whether or not the release force applying device is in a normal state on the basis of the estimated displacement amount; and
a controlling device for controlling the driving force applying device to apply the driving force corresponding to the release force, to the first or second engaging element, if it is judged that the release force applying device is not in the normal state, wherein
the driving force applying device applies the driving force which is greater than the release force, to the first or second engaging element, in engaging the first engaging element and the second engaging element.

2. The rotary meshing engagement apparatus according to claim 1, wherein the predetermined angle changes at a plurality of stages.

3. The rotary meshing engagement apparatus according to claim 1, wherein
the first engaging element is coupled with one rotational element out of a plurality of rotational elements in a hybrid vehicle, the hybrid vehicle comprising: a rotating electrical machine; a drive shaft coupled with an axle; an internal combustion engine; and a power transmission mechanism comprising the plurality of rotational elements which allows mutual differential rotation and which includes a first rotational element coupled with the rotating electrical machine, a second rotational element coupled with the drive shaft, and a third rotational element coupled with the internal combustion engine, and
the second engaging element is coupled with another rotational element or fixed element which is different from the one rotational element out of the plurality of rotational elements.

* * * * *